US005461864A

United States Patent [19]

Betta et al.

[11] Patent Number: 5,461,864

[45] Date of Patent: Oct. 31, 1995

[54] COOLED SUPPORT STRUCTURE FOR A CATALYST

[75] Inventors: Ralph D. Betta, Mountain View; Toru Shoji, Sunnyvale, both of Calif.; Seiichiro Tanaka, Tokyo, Japan

[73] Assignees: Catalytica, Inc., Mountain View, Calif.; Tanaka Kikinzoku Kogyo K.K., Tokyo, Japan

[21] Appl. No.: 165,966

[22] Filed: Dec. 10, 1993

[51] Int. Cl.$^{6}$ .......... F02C 1/00

[52] U.S. Cl. .......... 60/723

[58] Field of Search .......... 60/723, 39.31, 60/39.32; 431/7, 160, 170

[56] References Cited

U.S. PATENT DOCUMENTS

| | | | |
|---|---|---|---|
| 3,480,405 | 11/1969 | Hatcher . | |
| 3,558,064 | 1/1971 | Dederra . | |
| 3,957,445 | 5/1976 | Foster . | |
| 4,047,877 | 9/1977 | Flanagan | 60/723 |
| 4,168,946 | 9/1979 | Rice | 431/7 |
| 4,204,829 | 5/1980 | Kendall et al. | 431/7 |
| 4,384,843 | 5/1983 | Pfefferle | 431/7 |
| 4,413,470 | 11/1983 | Scheihing et al. . | |
| 4,432,207 | 2/1984 | Davis, Jr. et al. . | |
| 4,445,570 | 5/1984 | Retallick . | |
| 4,650,782 | 3/1987 | Onal . | |
| 4,870,824 | 10/1989 | Young et al. . | |
| 4,938,932 | 7/1990 | Burke | 60/723 |
| 5,026,273 | 6/1991 | Cornelison . | |
| 5,203,690 | 4/1993 | Maruko | 60/723 |
| 5,232,357 | 8/1993 | Dalla Betta et al. . | |
| 5,248,251 | 9/1993 | Dalla Betta et al. . | |
| 5,250,489 | 10/1953 | Dalla Betta et al. . | |

FOREIGN PATENT DOCUMENTS

| | | | |
|---|---|---|---|
| 1070127 | 1/1980 | Canada | 60/723 |
| 0198948 | 10/1986 | European Pat. Off. . | |

*Primary Examiner*—Timothy S. Thorpe
*Attorney, Agent, or Firm*—Morrison & Foerster

[57] ABSTRACT

A support structure for securing a catalyst structure wherein a combustion reactor has a plurality of hollow, internally cooled, elongated support members which are secured to the combustion reactor and which abut the catalyst structure to limit the axial movement of the catalytic structure. The support structure is in fluid communication with a cooling medium which maintains the support structure at a temperature at which its strength properties are retained.

20 Claims, 5 Drawing Sheets

COOLED SUPPORT STRUCTURE FOR A CATALYST

TECHNICAL FIELD

The present invention relates to support structures or holders for monolithic catalyst structures used in high temperature reactions such as catalytic combustors for gas turbine power plants. In addition, this invention relates to a method for using the support structure in a combustion process.

BACKGROUND OF THE INVENTION

The catalysts used in thermal combustion systems for gas turbines provide low emissions and high combustion-efficiency. To achieve high turbine efficiency, a high gas temperature is required. To obtain such high temperatures, the catalyst temperature must be high, affecting the strength of the materials used for the catalyst structure and its supporting members. Hence, there is a need to provide a support for catalytic structures while maintaining the temperature of the support low enough so that its strength is not adversely affected by the high temperature of the catalytic process. This is especially advantageous for metallic catalyst structures and metal support members since the strength of metals decrease rapidly at temperatures above 700°–800° C.

In a catalytic combustion reactor for a gas turbine, high gas flow through the reactor and high temperature place very large stresses on the catalyst structure and reactor. This can result in cracking, fracture, or distortion of the catalyst structure and reactor during operation. Because of these adverse operating conditions, support structures can be used to support and retain the catalyst structure within the reactor.

A catalyst structure which may be used in such adverse conditions is a monolithic structure comprising a carrier of a high temperature resistant, relatively fragile material such as any ceramic or a metallic foil. Such a catalyst structure may be a honeycomb-like structure having a large number of thin-walled channels extending in the direction of the gas flow. The catalyst structure may be designed to accept support members.

The catalyst structure may be supported in a variety of ways, including structures placed at the outlet of the catalyst structure or circumferentially about the catalyst structure. All support structures are subject to the high temperature of the catalytic reaction, and often are cooled using externally induced cooling to maintain their strength. An example of a catalyst structure with a circumferential support is described in U.S. Pat. No. 4,432,207, to Davis Jr. et al. Davis Jr. et al. disclose a modular catalytic structure with support for the individual catalyst modules. The supports for the catalyst modules are circumferential sheet metal fabrications having integral passageways for cooling air. The proposed source of air is the gas turbine compressor. The disclosure is directed to a catalytic assembly made with catalytic sub-units to provide minimal stress due to thermal gradients. Davis et al. does not teach the use of a catalyst support using a structural component at the outlet of the catalyst to prevent axial movement of the catalyst.

Another example of a circumferential support is described in U.S. Pat. No. 4,413,470 to Scheihing et al. Scheihing et al. discloses a transition duct mounted catalytic element support for use in gas turbines. The catalytic element is supported on each end by a circumferential spring clip assembly, which also functions to hold the catalyst in position within the duct. This patent is directed toward a catalytic bed with a support system that can easily be retrofitted into existing gas turbines. Although the rear spring clip assembly is said to be capable of being cooled, Scheihing et al. is silent on a method of how to accomplish such a goal.

The use of a circumferential support in an application other than gas turbines can be found in U.S. Pat. No. 3,957,445 to Foster. Foster discloses an automotive emissions control catalyst design that uses a circumferential support that is spring loaded to maintain a good gas seal in and out of the catalyst. The spring and circumferential support are cooled by a pressurized air supply. The objective of this design is to provide good sealing for the gas flow into the catalyst independent of the thermal expansion of the catalyst and engine members.

U.S. Pat. No. 3,480,405 to Hatcher describes a structure to support a particulate or pelleted catalyst bed. The support consists of a complicated arrangement of plates, tubes, and internal passageways through which a cooling fluid is passed. This arrangement has the disadvantage of restricting the gas flow and causing a large pressure drop which would reduce the efficiency of the gas turbine. In addition, the size of this support structure would substantially cool the gas stream, a disadvantage in the case of the catalytic combustion process.

In those support structures which are cooled, air is often used as a cooling medium. However, other gases, or liquids can be used depending upon their availability and desirability. For example, in U.S. Pat. No. 3,480,405 to Hatcher, a liquid cooled support for a catalyst bed used in the production of HCN is disclosed. The Hatcher design also requires physical separation of the cooling medium from the reaction gas.

U.S. Pat. No. 5,026,273 to Conelison and the above discussed U.S. Pat. No. 4,413,470 to Scheihing show actual combustor designs for gas turbines. Neither of these designs show structures supporting the downstream face of the catalyst. Since these catalysts are typically quite large, 10 to 25 inches in diameter, the total force on the structure can be quite large. As an example, for a typical catalyst with a pressure drop of 3 psi due to the gas flow through the catalyst, the total force on the catalyst structure would be 240 lbs. for a 10 in. diameter catalyst and 1500 lbs. for a 25 in. diameter structure. To withstand this force, the catalyst structure would have to be quite long, have thick walls and be composed of materials with high strength. These are all disadvantages. Catalyst structures with several short sections could not be used in these designs. Also, materials with lower strength, such as metals operating at high temperature, could not be used as a catalyst support. In addition, cracking or distortion of the catalyst resulting in failure would allow part or all of the catalyst to travel into the power turbine blades causing severe damage and very costly repairs.

None of the documents discussed above suggest the internally-cooled support structure for securing a catalyst structure within a combustion reactor, as is described below.

SUMMARY OF THE INVENTION

This invention is directed to a support structure for a catalyst structure and a method for using the support structure in a combustion process wherein the fuel and oxygen-containing combustion gas mixture is passed as a flowing gas stream through the catalyst structure. In one embodiment, this invention is a support structure for securing a catalyst structure within a reactor, the support structure comprising a plurality of hollow, elongated, support members which extend through and are secured to the reactor, the hollow support members being positioned in a direction perpendicular to the flowing combustion gas mixture to abut the outlet side of the catalyst structure so as to prevent axial movement of the catalyst structure towards the support members, the support members being in fluid communication with a source of cooling medium, and the support members further having at least one aperture for exhausting the cooling medium. In another embodiment the support members are arranged in a spoke configuration and are connected to a hollow central hub, the hub being connected to and in fluid communication with a hollow transverse member, the transverse member extending axially through the catalyst structure from the central hub to the inlet side of the catalyst structure, and the transverse member being open on the inlet side of the catalyst structure for exhausting the cooling medium to the inlet side of said catalyst structure.

In yet another embodiment, a support structure for securing the position of a catalyst structure in a combustion reactor is provided wherein a flowing uncombusted oxygen-containing gas and fuel mixture is passed through the catalyst structure, the support structure comprising a plurality of hollow, elongated, support members positioned in a direction perpendicular to the flowing gas mixture to abut the outlet side of the catalyst structure and secured to the combustion reactor, and at least one transverse member which is connected to and in fluid communication with the support members, the transverse member extending axially through the catalyst structure from the support members to the inlet side of the catalyst structure, the transverse member being open on the inlet side of the catalyst structure for receiving and channeling an uncombusted oxygen-containing gas and fuel mixture to the support members, and the support members having at least one aperture for exhausting the uncombusted oxygen-containing gas and fuel mixture to the outlet side of the catalyst structure.

In yet another embodiment, a process for the combustion of a hydrocarbonaceous fuel to form a hot gas product is provided wherein the fuel is at least partially combusted, the process comprising the steps of forming an mixture of the fuel with an oxygen-containing gas, and passing the oxygen-containing gas and fuel mixture as a flowing gas stream through a monolithic catalyst structure positioned in a reaction chamber, the catalyst structure being stabilized in the reaction chamber by a plurality of hollow, internally-cooled, support members which abut the outlet side of the catalyst structure thereby limiting the axial movement of the catalyst structure in the direction of the flowing oxygen-containing fuel mixture.

DESCRIPTION OF THE INVENTION

This invention is an internally-cooled support structure for securing the position of a catalyst structure within a combustion reactor. In addition, this invention is directed to a method using this support structure in a combustion process. More particularly, this invention is directed to a support structure which limits the axial movement of a relatively fragile catalyst structure within a combustion reactor. In addition to limiting the axial movement of the catalyst structure, the support structure increases the strength of the catalyst against the force imposed by the gas flow through the catalyst.

Figure 1:
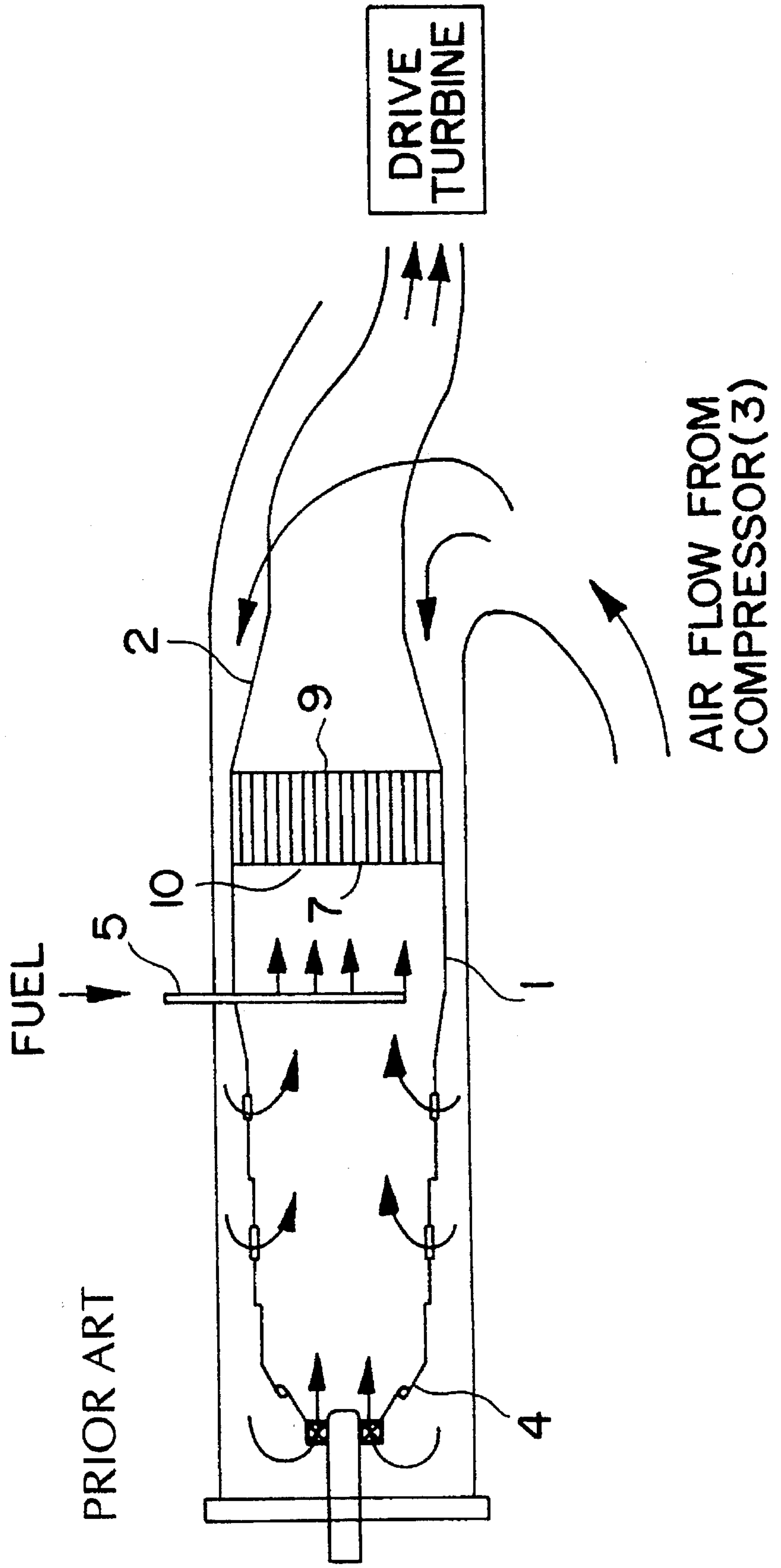
FIG. 1 is a side view of a catalytic combustion reactor in a gas turbine combustor.

A typical catalytic combustion reactor is shown in FIG. 1. As shown in this figure, a catalyst structure (10) is positioned in a combustion reactor (1) downstream of a preburner (4) and perpendicular to an oxygen-containing gas, typically air, and fuel mixture being introduced to the catalyst structure via fuel injector (5). The catalyst structure is positioned in this manner to obtain a uniform flow of air/fuel mixture through the catalyst, and to allow the mixture to pass through passageways which extend longitudinally through the catalyst structure.

The catalyst structure can be made according to any of the well known designs, particularly monolithic catalyst structures comprising a multiplicity of parallel longitudinal channels or passageways at least partially coated with catalyst. For example, a spiral catalyst structure may be used. Such a structure is made by rolling a crimped catalyst foil into a large spiral. Alternatively, the catalyst structure may be formed from a plurality of parallel layers of crimped catalytic metal foil. Regardless of the type of catalyst structure, a support structure which abuts the outlet side (9) of the catalyst structure is needed to support and retain the catalyst structure in place within the combustion reactor. As used herein, the "outlet side" (9) of the catalyst structure is the side where the partially or completely combusted air/fuel mixture exits the catalyst structure. Therefore, the "inlet side" (7) of the catalyst structure is the side where the uncombusted air/fuel mixture is initially introduced to the catalyst structure.

The Support Structure

The support structure of the present invention is comprised of a plurality of hollow, elongated members which abut the outlet side of the catalyst structure. Typically, these members are made from a high strength metal. However, other high strength materials could be used provided they have sufficient heat resistance. The support structure may be subjected to temperatures in excess of 900° C. as a result of the combustion process. Since most metals show a precipitous drop in strength at temperatures above 800° C., it is desirable to transfer heat away from the structure so as to keep the metal below 800° C.

Figure 2:
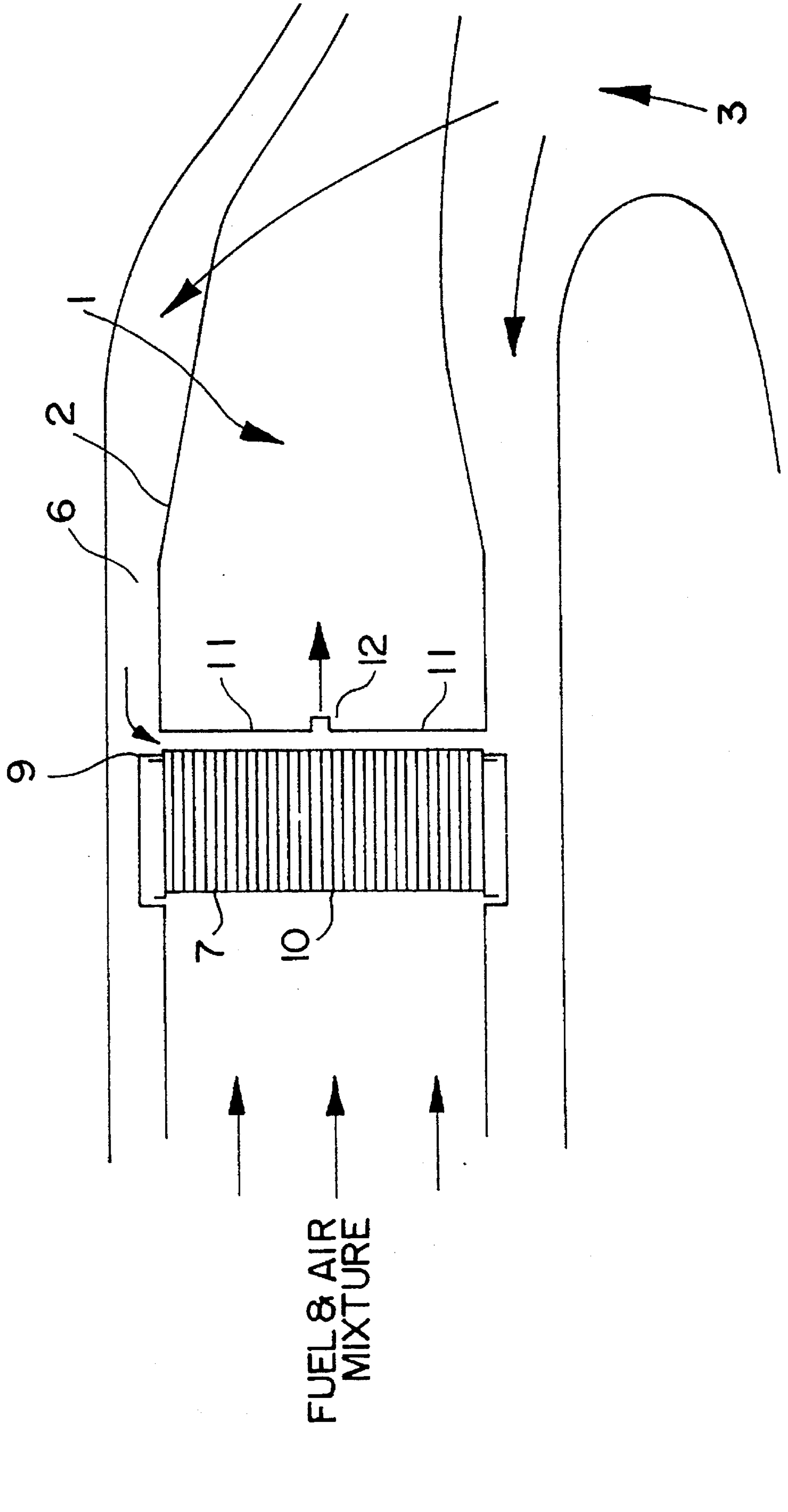
FIG. 2 is a side view of a catalytic combustion reactor showing one embodiment of the inventive support structure.
Figure 3:
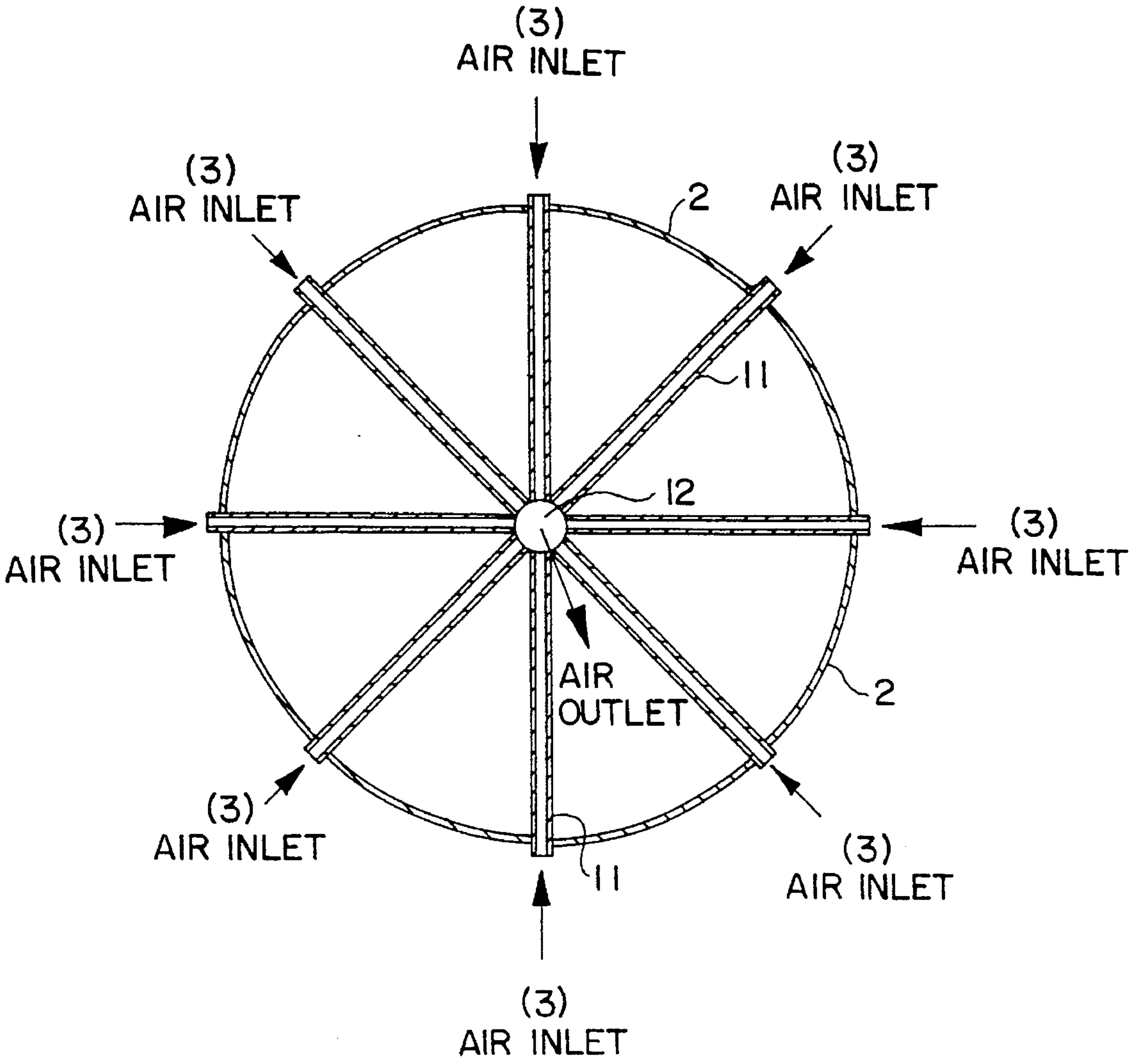
FIG. 3 is a front view of the spoke arrangement of the inventive support structure shown in FIG. 2.

For this reason, the support structure of the present invention is comprised of hollow, elongated members which are cooled by a fluid having a temperature lower than the temperature of the partially or completely combusted air/fuel mixture. One embodiment of the support structure is shown in FIGS. 2 and 3. As shown in these figures, this embodiment is comprised of a plurality of hollow support members (11) which are arranged in a spoke configuration and connected to a central hub (12). The hollow support members penetrate the combustion chamber liner (2) and receive air from a compressor through an inlet (3). The support members (11) are secured to the combustion chamber liner providing restriction of movement and strength to the support structure. The central hub (12) collects the cooling medium after it has passed through the various support members (11) and functions as an outlet for the cooling medium. One or more apertures may be located on this central hub for exhausting the cooling medium.

The discharge air from a turbine compressor may be used as the cooling medium. The pressure drop across the preburner and the catalyst structure result in a lower pressure at (12) compared to the pressure outside the combustion chamber liner (6). This provides the driving force for the flow of the air/fuel mixture through the hollow support members (11).

The cooling medium which flows through the support members (11) is at a lower temperature than the partially or completely combusted air/fuel mixture exiting the outlet side of the catalyst structure. More specifically, the temperature of the cooling medium is typically in the range of 250° to 350° C., while the temperature of the exiting air/fuel mixture is in the range of 850° to greater than 1350° C. After the cooling medium has passed through the support members (11), it is exhausted through at least one aperture located on the central hub (12) and is mixed with the partially or completely combusted air/fuel mixture that has passed through the catalyst structure.

In some applications, exhausting the cooling medium through a single aperture may be undesirable since it may create an unhomogeneous mixture and may quench homogenous combustion reactions occurring in the region immediately downstream of the catalyst outlet side. Such quenching may result in the presence of unburned hydrocarbons and carbon monoxide at the end of the combustion chamber and subsequently exhausted from the turbine. A more homogeneous mixture may be achieved by providing a plurality of apertures in the side of the support members facing away from the catalyst structure for exhausting the cooling medium.

Figure 6:
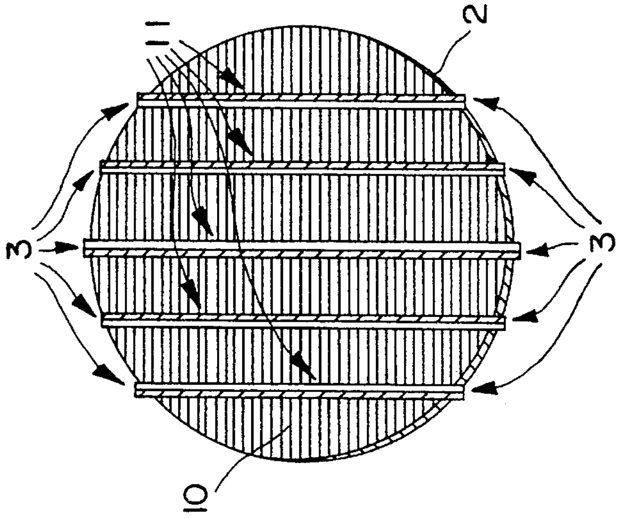
FIG. 6 is a front view of the parallel or grid arrangement of the inventive support structure.

An alternative configuration of the embodiment shown in FIGS. 2 and 3 involves a parallel or grid arrangement of the hollow support members. The parallel or grid arrangement is shown in FIG. 6. The hollow support members (11) penetrate the combustion chamber liner, allowing compressor discharge air to enter at air inlets (3). This air will cool these support members and then be discharged through apertures along the length of the support members (11) and mix with the air/fuel flow exiting the catalyst.

Figure 4:
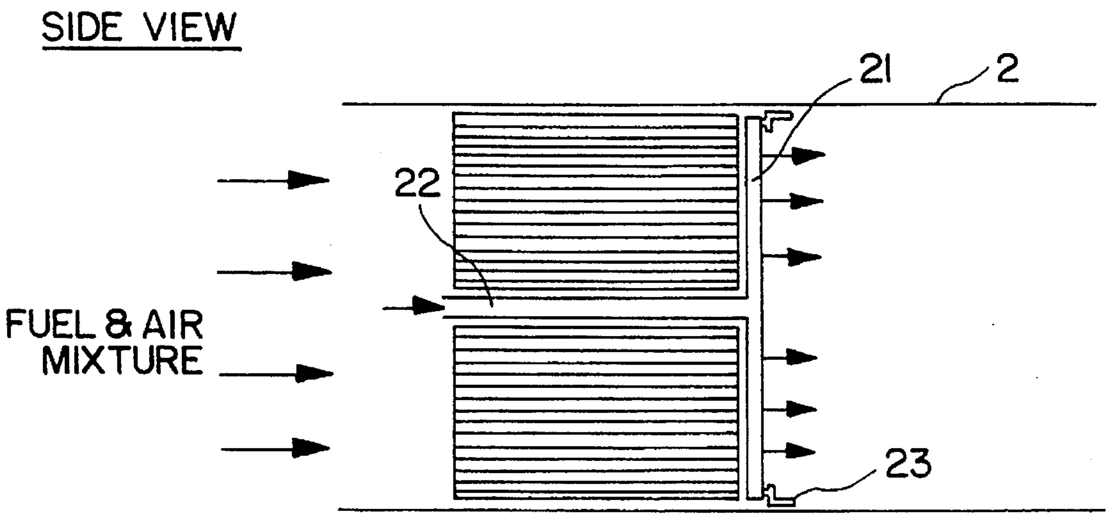
FIG. 4 is a side view of a variation of the inventive support structure which uses the uncombusted air/fuel mixture as the cooling medium.
Figure 5:
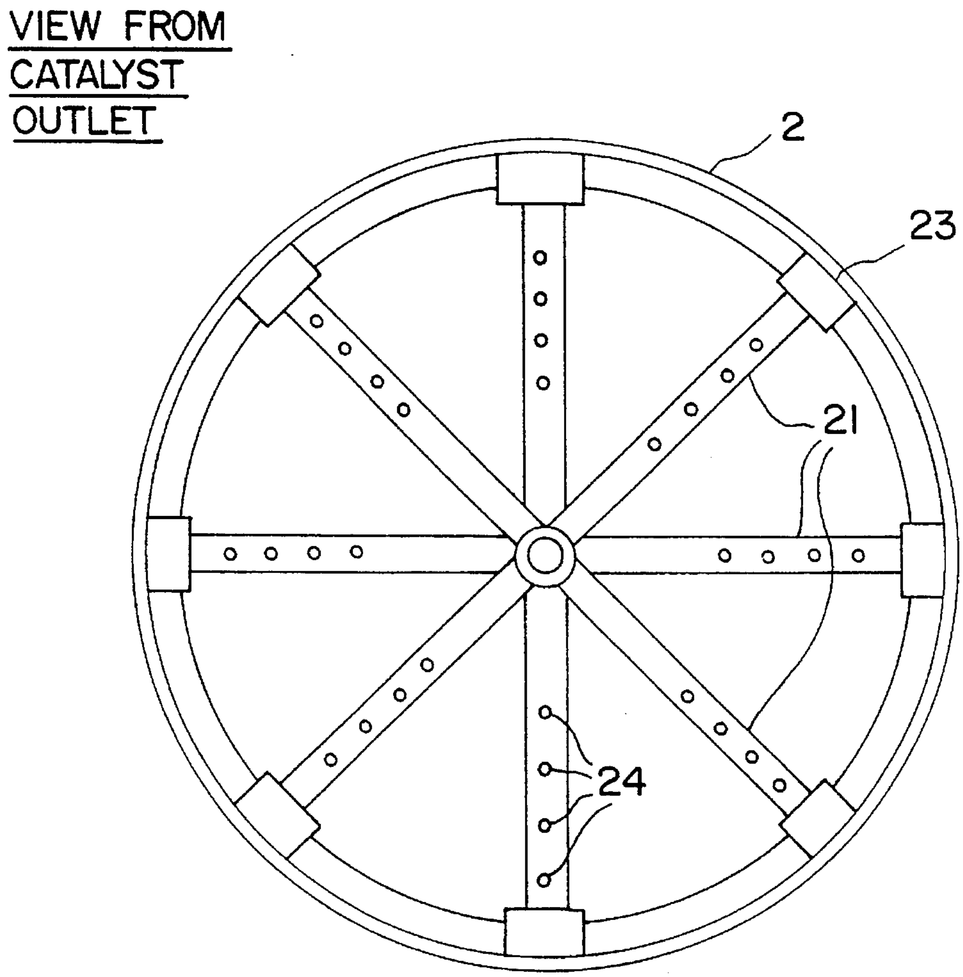
FIG. 5 is a front view of the inventive support structure shown in FIG. 4.

Another embodiment of a support structure is shown in FIGS. 4 and 5. In this embodiment, the support structure is comprised of a plurality of support members (21) which do not penetrate the combustion chamber liner. The support members are connected via a central hub (12) and in fluid communication with one or more transverse members (22). The transverse member is a hollow elongated member which extends through the length of the catalyst structure from the inlet side of the catalyst structure to the outlet side. The transverse member receives and channels the relatively cool uncombusted air/fuel mixture to the support members. The support members abut the outlet side of the catalyst structure and are secured to the combustion chamber liner (2) by brackets (23) which can be an integral part of the combustion chamber liner. Alternatively, the brackets or other fastener can be welded or fastened to the liner (2). The cooling medium will exit the support members through a plurality of apertures (24) extending at least a portion of the length of at least one support member for evenly distributing the uncombusted air/fuel mixture. In this design, the flow of the cooling medium is driven by the pressure drop across the catalyst structure. The support members can also be retained by a flange protruding from the combustion chamber liner extending around the entire inside surface of the combustion chamber.

An alternative configuration of the embodiment shown in FIG. 4 has the transverse member comprised of a plurality of hollow, elongated members which pass through the center of the catalyst structure. These transverse members are bent at an approximate 90° angle at the edge of the catalyst structure outlet side so that they form a spoke configuration. These transverse members are also configured to abut the outlet side of the catalyst structure. Alternatively, the support members may be bent at 90° angles to form a parallel or a grid configuration. See FIG. 6 for an example of the parallel or grid configuration.

Figure 7:
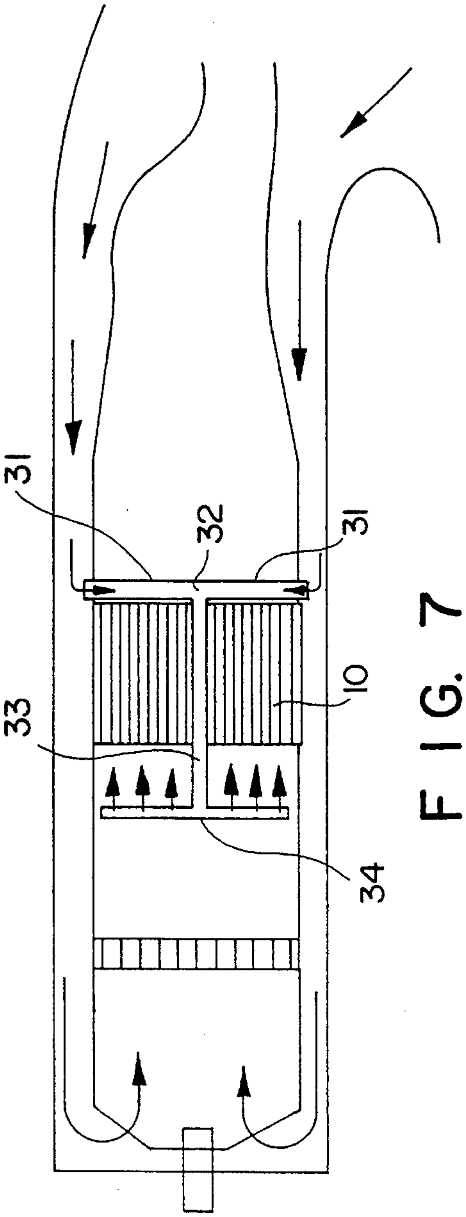
FIG. 7 is a side view of an embodiment of the inventive support structure which uses a manifold to direct the cooling medium to the inlet side of the catalyst structure.

One disadvantage of the embodiments described above is that the cooling medium is exhausted at the outlet side of the catalyst structure, and since this cooling medium will be substantially lower in temperature than the partially or completely combusted air/fuel mixture, the homogenous combustion reactions occurring immediately downstream of the catalyst structure may be quenched, resulting in high levels of unburned hydrocarbons or carbon monoxide escaping from the gas turbine. A support structure designed to minimize the problem of quenching the post-catalyst combustion is shown in FIG. 7. In this embodiment, the support members (31) penetrate the combustion chamber liner and are in fluid communication with a cooling medium. The support members abut the outlet side of the catalyst structure to as to limit the axial movement of the catalyst structure in the direction of the air/fuel mixture flow. The support members are connected via a central hub (32). The central hub is connected to and in fluid communication with a hollow transverse member (33) which extends through the catalyst bed from the central hub to the inlet side of the catalyst structure. Compressed air from the turbine air compressor may be used as the cooling medium. This cool air passes through the support members (31) and transports heat away from them. The partially-heated air continues to pass through the transverse member (33), and then is directed to the inlet side of the catalyst, where it is exhausted at the inlet side of the catalyst structure. The partially-heated cooling air is then mixed with the uncombusted air/fuel mixture to undergo combustion in the catalyst structure.

Alternatively, the cooling medium may be distributed by a manifold (34) which is connected to and in fluid communication with the transverse member (33). The manifold receives the partially-heated cooling medium and uniformly distributes the cooling medium to the inlet side of the catalyst structure.

Alternatively, a parallel or grid arrangement can be used in which the partially-heated cooling medium is directed to the inlet side of the catalyst structure using a plurality of hollow transverse members which are in fluid communication with the support members. The transverse members extend through the catalyst structure and are capable of discharging the cooling medium to the inlet side of the catalyst structure. At least one transverse member should be connected to each support member.

In all of the above embodiments, either air from the compressor discharge or the air/fuel mixture from the inlet side of the catalyst structure is used as the cooling medium. The relative low pressure of these gases requires that the hollow members have relatively large cross sectional areas, with the concomitant restriction of gas flow through the catalyst structure. The support members may be of any geometric cross section. Although the use of a circular cross section member is suitable, the use of a circular support member results in significant restriction in the flow of the air/fuel mixture through the catalyst at the point where the member contacts the catalyst structure. Alternatively, an elliptical cross section offers a smaller cross section and thus, provides less restriction to the flow of the air/fuel mixture through the catalyst structure. A rectangular cross section also offers a smaller cross section as well as providing a large internal passage for obtaining high flow rates with a relatively small pressure drop. Finally, a circular cross section member may be used in conjunction with a riser. The riser is a small piece of material which is suitably attached to the circular member and abuts the catalyst structure. The riser has a smaller cross section, and thus functions to move the larger cross section circular member back from the catalyst structure and reduce the amount of restriction in flow in the adjacent catalyst structure.

A further disadvantage of the embodiments described above is the introduction of the cooling medium into either an uncombusted or partially combusted air/fuel mixture which can lead to nonhomogeneous combustion and/or quenching of post catalyst structure combustion. This disadvantage may be overcome by using a closed cooling system for the support structure. In an embodiment which uses a closed cooling system, the support members at the outlet side of the catalyst structure penetrate the combustion chamber liner. A supply of a cooling medium, either liquid or gaseous, is forced through the hollow support members to cool them. The cooling medium is collected and removed from the support structure and the waste heat is then disposed of or recycled.

THE PROCESS

The support structure described above can be used in a process for the catalytic combustion of a hydrocarbonaceous fuel. In this process, an oxygen-containing gas, such as air, is mixed with a hydrocarbonaceous fuel to form a combustible oxygen/fuel mixture. This oxygen/fuel mixture is passed as a flowing gas through a monolithic catalyst structure that is positioned within a reaction chamber to combust the oxygen/fuel mixture and form a hot, partially or completely combusted, gas product.

A variety of catalyst structures can be used in this process. For example, a catalyst structure having integral heat exchange surfaces as described in U.S. Pat. No. 5,250,489, "CATALYST STRUCTURE HAVING INTEGRAL HEAT EXCHANGE", or a graded palladium-containing partial combustion process catalyst as described in co-pending application, Ser. No. 07/617,973, and U.S. Pat. No. 5,248,251, both titled "GRADED PALLADIUM-CONTAINING PARTIAL COMBUSTION CATALYST AND PROCESS FOR USING IT", may be used in this invention. In addition, the process may involve complete combustion of the fuel or partial combustion of the fuel as described in co-pending application, U.S. Ser. No. 08/088,614, "PROCESS FOR BURNING COMBUSTIBLE MIXTURES". Furthermore, the process may be a multistage process in which the fuel is combusted stepwise using specific catalysts and catalyst structures in the various stages, as described in U.S. Pat. No. 5,232,357, "MULTISTAGE PROCESS FOR COMBUSTING FUEL MIXTURES USING OXIDE CATALYSTS IN THE HOT STAGE". The above six patents and patent applications are herein incorporated by reference.

This process also involves stabilizing the position of the catalyst structure so as to prevent the axial movement of the catalyst structure. The catalyst structure is stabilized by an internally cooled support structure comprised of a plurality of hollow support members which abut the outlet side of the catalyst structure and are secured in some fashion to the combustion chamber liner to prevent the axial movement of the catalyst structure as the air/fuel flowing gas forces the catalyst structure in the direction of the flowing gas.

The support structure is also in fluid communication with a cooling medium so as to prevent degradation of the support structure due to the high temperatures of the catalytic combustion process. The support structure may be configured to use either compressed air from the gas turbine compressor, uncombusted oxygen/fuel mixture from the inlet side of the catalyst structure, or an externally supplied fluid for the cooling medium as discussed previously. Furthermore, the support structure may be configured to exhaust the cooling medium either at the outlet or inlet side of the catalyst structure as discussed previously.

It should be clear that one having ordinary skill in the art could envision equivalents to the devices found in the claims that follow and that these equivalents would be within the scope and spirit of the claimed invention.

We claim:

1. A support structure for securing within a reactor a catalyst structure made up of a multiplicity of longitudinally disposed channels for passage of a flowing gas mixture, said support structure comprising:

a plurality of hollow, elongated support members which extend through and are secured to said reactor, said hollow support members being positioned in a direction perpendicular to the longitudinal axis of said catalyst structure and positioned to abut the outlet side of said catalyst structure so as to prevent axial movement of said catalyst structure towards said support members, said support members being in fluid communication with a source of cooling medium, and said support members further having at least one aperture for exhausting said cooling medium.

2. The support structure of claim 1 wherein said hollow support members are arranged in a spoke configuration and are connected to a hollow central hub, said hub having at least one aperture for exhausting said cooling medium.

3. The support structure of claim 1 wherein at least one of said plurality of support members has a plurality of apertures for exhausting said cooling medium.

4. The support structure of claim 1 wherein said support members are arranged in a configuration parallel to each other.

5. The support structure of claim 4 wherein said support members have a plurality of apertures to exhaust said cooling medium.

6. The support structure of claim 1 wherein said support members are arranged in a spoke configuration and are connected to a hollow central hub, said hub being connected to and in fluid communication with a hollow transverse member, said transverse member extending axially through said catalyst structure from said central hub to the inlet side of said catalyst structure, and said transverse member being open on the inlet side of said catalyst structure for exhausting said cooling medium to the inlet side of said catalyst structure.

7. The support structure of claim 6 wherein said transverse member is connected to and in fluid communication with a manifold, said manifold having at least one aperture for exhausting said cooling medium to the inlet side of said catalyst structure.

8. The support structure of claim 1 wherein said support members comprise circular cross-section metal tubing.

9. The support structure of claim 1 wherein said support members comprise elliptical cross-section metal tubing.

10. The support structure of claim 1 wherein said support members comprise rectangular cross-section metal tubing.

11. A support structure for securing the position of a catalyst structure in a combustion reactor, wherein said catalyst structure is made up of a multiplicity of longitudinally disposed channels for passage of a flowing gas mixture and wherein a flowing uncombusted oxygen-containing gas and fuel mixture is passed through said catalyst structure, said support structure comprising:

a plurality of hollow, elongated support members positioned in a direction perpendicular to the longitudinal axis of said catalyst structure and positioned to abut the outlet side of said catalyst structure and further secured to said combustion reactor, and at least one transverse member which is connected to and in fluid communication with said support members, said transverse member extending axially through said catalyst structure from said support members to the inlet side of said catalyst structure, said transverse member being open on the inlet side of said catalyst structure for receiving and channeling said uncombusted oxygen-containing gas and fuel mixture to said support members, and said support members having at least one aperture for exhausting said uncombusted oxygen-containing gas and fuel mixture to the outlet side of said catalyst structure.

12. The support structure of claim 11 wherein said support members are arranged in a spoke configuration and are connected to a hollow central hub, said hub having at least one aperture for exhausting said uncombusted oxygen-containing gas and fuel mixture.

13. The support structure of claim 11 wherein at least one of said plurality of support members has a plurality of apertures for exhausting said uncombusted oxygen-containing gas and fuel mixture.

14. The support structure of claim 11 wherein said support members are arranged in a configuration parallel to each other.

15. The support structure of claim 11 wherein said support members comprise circular cross-section metal tubing.

16. The support structure of claim 11 wherein said support members comprise elliptical cross-section metal tubing.

17. The support structure of claim 11 wherein said support members comprise rectangular cross-section metal tubing.

18. A process for the combustion of a hydrocarbonaceous fuel to form a hot gas product wherein the fuel is at least partially combusted, the process comprising the steps of:

a) forming a mixture of the fuel with an oxygen-containing gas, and b) passing the oxygen-containing gas and fuel mixture as a flowing gas stream through a monolithic catalyst structure positioned in a reaction chamber, said catalyst structure made up of a multiplicity of longitudinally disposed channels for passage of said flowing gas stream, said catalyst structure being stabilized in said reaction chamber by a plurality of hollow, internally-cooled, elongated support members which are positioned in a direction perpendicular to the longitudinal axis of said catalyst structure and which are secured to said reaction chamber and which abut the outlet side of said catalyst structure, thereby limiting the axial movement of said catalyst structure parallel to the longitudinal axis of said catalyst structure.

19. In a process for the catalytic combustion of a fuel wherein a mixture of fuel and an oxygen-containing gas are passed as a flowing gas stream through a monolithic catalyst structure, said catalyst structure being made up of a multiplicity of longitudinally disposed channels for passage of said flowing gas stream, to effect at least partial combustion of the fuel, the improvement comprising:

a) stabilizing the position of the catalyst structure in the fuel and oxygen-containing gas mixture flow by a plurality of hollow, elongated support members which are positioned in a direction perpendicular to the longitudinal axis of the catalyst structure and which abut the outlet side of said catalyst structure, and b) cooling said hollow support members with a cooling medium.

20. In a process for the high temperature conversion of reactants to products wherein the reactants in mixture are passed as a gas flow through a monolithic catalyst structure positioned in a reaction chamber, said catalyst structure being made up of a multiplicity of longitudinally disposed channels for passage of said gas flow, the improvement comprising:

stabilizing the position of the catalyst structure in the gas flow by means of a plurality of hollow, internally-cooled, elongated support members which are positioned in a direction perpendicular to the longitudinal axis of the catalyst structure and which extend into the reaction chamber and abut the outlet end of the catalyst structure.

* * * * *